United States Patent [19]

Nakamichi

[11] 4,414,596
[45] Nov. 8, 1983

[54] MAGNETIC HEAD ASSEMBLY

[75] Inventor: Niro Nakamichi, Higashikurume, Japan

[73] Assignee: Nakamichi Corporation, Tokyo, Japan

[21] Appl. No.: 274,554

[22] Filed: Jun. 17, 1981

[30] Foreign Application Priority Data

Jun. 24, 1980 [JP] Japan ............................. 55-88331[U]

[51] Int. Cl.³ ........................... G11B 5/10; G11B 5/25
[52] U.S. Cl. .................................. 360/129; 360/119; 360/121
[58] Field of Search ................ 360/129, 124, 119–121, 360/118

[56] References Cited

U.S. PATENT DOCUMENTS 3,806,902 4/1974 Drees et al. .................... 360/121 X
4,107,751 8/1978 Shimoda ......................... 360/121 X

FOREIGN PATENT DOCUMENTS 1028793 4/1958 Fed. Rep. of Germany ...... 360/118
35-23324 9/1960 Japan .
51-21720 6/1976 Japan .
1008728 11/1965 United Kingdom ................ 360/118
544993 of 0000 U.S.S.R. ............................. 360/121
595773 6/1976 U.S.S.R. ............................. 360/118

Primary Examiner—John H. Wolff
Attorney, Agent, or Firm—Pearne, Gordon, Sessions, McCoy, Granger & Tilberry

[57] ABSTRACT

A magnetic head suitable for a reversible stereo cassette tape recorder is disclosed. The magnetic head had a larger operating gap for the recording head than for the reproducing head. This is accomplished by a thicker spacer between the core pieces for the recording head than for the reproducing head. The two spacers are in line, and the core pieces are held on one hand by a common holding member and on the other hand by separate lower and upper holding members.

3 Claims, 5 Drawing Figures

U.S. Patent    Nov. 8, 1983    4,414,596
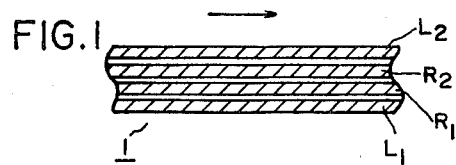
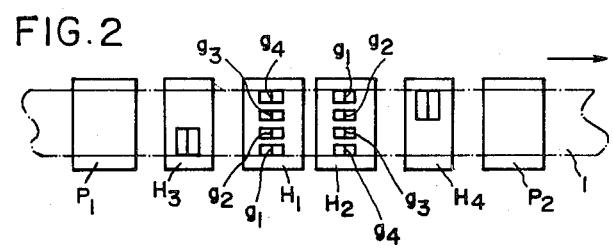
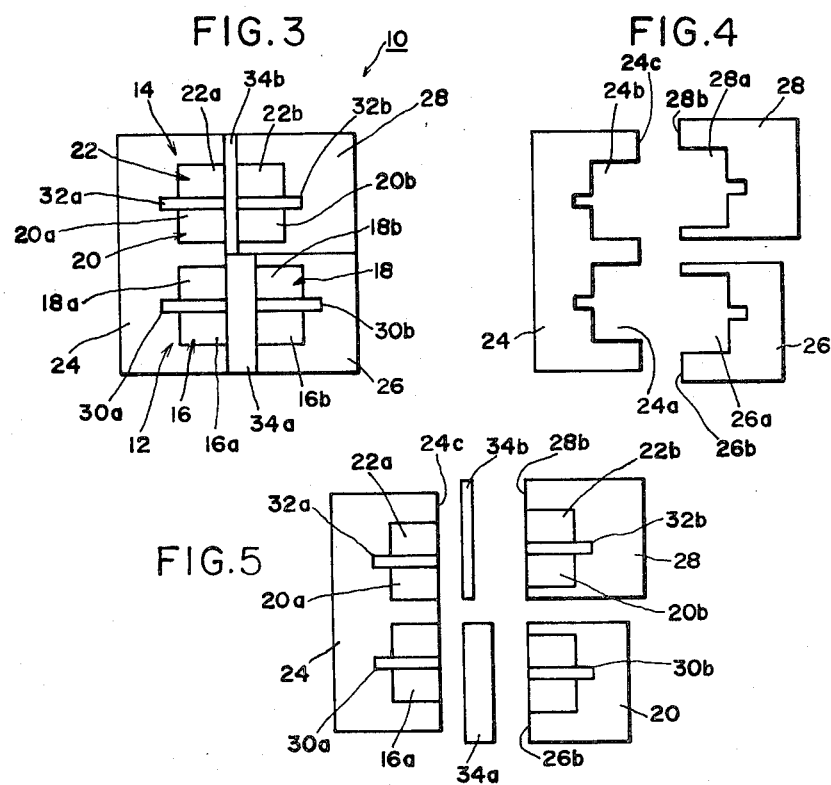

MAGNETIC HEAD ASSEMBLY

BACKGROUND OF THE INVENTION

A cassette tape for a cassette tape recorder has four tracks as shown in FIG. 1 in case it is used for a two channel stereo cassette tape recorder. When the tape 1 runs in a forward direction as shown at an arrow in FIG. 1, two lower adjacent tracks $L_1$ (left channel) and $R_1$ (right channel) are used, and when it runs in a reverse direction that is a direction reverse to that as shown at the arrow in FIG. 1, two upper adjacent tracks $L_2$ (left channel) and $R_2$ (right channel) are used.

In case that the cassette tape is used in a non-reversible tape recorder, record and/or playback can be accomplished at the lower and upper tracks by turning over the cassette in which the tape 1 is contained.

Also, it is noted that the tape cassette can be used in a reversible cassette tape recorder in which record and/or playback can be accomplished at the lower and upper tracks by reversing the running direction of the tape 1 without turning over the cassette. FIG. 2 shows one idea of head configuration for the reversible stereo cassette tape recorder having each exclusive operating gap for erase, record, or playback. In FIG. 2, head groups are disposed between pinch rollers $P_1$ and $P_2$ which are introduced into the cassette (not shown) through respective outside openings of five front openings thereof. A pair of heads $H_1$ and $H_2$ serving as recording and reproducing heads are introduced into the cassette through the center one of the openings of them and a pair of heads $H_3$ and $H_4$ serving as erasing heads are introduced into the cassette through respective remaining cassette openings. When the heads $H_1$, $H_2$, $H_3$ and $H_4$ are introduced into the cassette, they engage the tape 1 in the cassette. The erasing head $H_3$ has an operating gap corresponding to the tracks $L_1$ and $R_1$ of the tape 1 while the erasing head $H_4$ has an operating gap corresponding to the tracks $L_2$ and $R_2$ of the tape 1. The head $H_1$ has four operating gaps in line of which two lower gaps are recording gaps $g_1$ and $g_2$ corresponding to the tracks $L_1$ and $R_1$ of the tape 1 and the two upper gaps are reproducing gaps $g_3$ and $g_4$ corresponding to the tracks $R_2$ and $L_2$ of the tape 1 while the head $H_2$ has four operating gaps in line of which two lower gaps are reproducing gaps $g_3$ and $g_4$ corresponding to the tracks $R_1$ and $L_1$ of the tape 1 and the two upper gaps are recording gaps $g_1$ and $g_2$ corresponding to the tracks $L_2$ and $R_2$ of the tape 1. It will be noted that the heads $H_1$ and $H_2$ are disposed in a symmetrical manner relative to the position of recording and reproducing gaps.

When the tape 1 runs in the forward direction, the operating gap of the erasing head $H_3$, the operating gaps $g_1$ and $g_2$ of the head $H_1$ and the operating gaps $g_3$ and $g_4$ of the head $H_2$ are in the operating condition. When the tape 1 runs in the reverse direction, the operating gap of the erasing head $H_4$, the operating gaps $g_1$ and $g_2$ of the head $H_2$ and the operating gaps $g_3$ and $g_4$ of the head $H_1$ are in the operating condition. Thus, this head configuration may be embodied in a three-head type of reversible cassette tape recorder in which record or playback is made by each exclusive operating gap and a recorded signal can be monitored by reproducing gaps. In practice, it is easy to manufacture a conventional magnetic head having four gaps which are in line and have the same gap length and to use such magnetic head as each head $H_1$ and $H_2$.

However, for obtaining an excellent record and playback characteristic, it is desired that a gap length for recording gap is large (about 3 microns, for example), while a gap length of reproducing gap is small (about 0.6 microns, for example).

SUMMARY OF THE INVENTION

Accordingly, it is a principal object of the invention to provide a magnetic head assembly which is suitably used for a reversible cassette tape recorder and in which at least one recording gap for one direction of tape movement and at least one reproducing gap for another direction of tape movement are formed in line with the recording and reproducing gaps having gap length different from each other.

In accordance with the invention, there is provided a magnetic head having a plurality of operating gaps in line which are formed between a plurality of pairs of left-hand and right-hand core pieces facing each other, said left-hand and right-hand core pieces including first and second core piece groups, characterized by comprising a common holding member to hold one-hand core pieces together; first and second divided holding members to hold first and second core piece groups of other-hand core pieces, respectively, first spacer means interposed between said first core piece group of said other-hand core pieces and the corresponding core piece group of said one-hand core pieces; and second spacer means interposed between said second core piece group of said other-hand core pieces and the corresponding core piece group of said one-hand core pieces; said first and second spacer means having thicknesses different from each other, whereby first and second gap groups having gap lengths different from each other are formed in line.

BRIEF DESCRIPTION OF THE DRAWING

The above and other objects and features of the invention will be apparent from the description of the embodiment of the invention taken along with the accompanying drawing in which;

FIG. 1 shows tracks of a cassette tape for domestic use;

FIG. 2 shows one idea of head configuration for a reversible stereo cassette tape recorder;

FIG. 3 is an enlarged front view of a magnetic head of the invention;

FIG. 4 is a front view of holding members comprising the magnetic head of FIG. 3; and FIG. 5 shows how to assemble the components of the magnetic head of the invention.

DETAILED DESCRIPTION OF THE EMBODIMENT

FIG. 3 shows a magnetic head 10 constructed in accordance with one embodiment of the invention. The magnetic head 10 comprises two core piece groups 12 and 14, one of which includes lower core pieces 16 and 18 and the other of which includes upper core pieces 20 and 22. The lower core pieces 16 and 18 correspond to the lower tracks $L_1$ and $R_1$ of the cassette tape 1 as shown in FIG. 1 while the upper core pieces 20 and 22 correspond to the upper tracks $L_2$ and $R_2$ of the cassette tape 1. The core pieces 16, 18, 20 and 22 comprise left-hand and right-hand core pieces 16a and 16b, 18a and 18b, 20a and 20b, and 22a and 22b, respectively.

FIG. 4, shows holding members to hold core pieces. A common holding member 24 and two divided holding members 26 and 28 are formed of nonmagnetic material and ship-shaped. The common holding member 24 has a recess 24a in which the two left-hand core pieces 16a and 18a of the lower core pieces 16 and 18 are held and a recess 24b in which the two core left-hand 20a and 22a of the upper core pieces 20 and 22 are held. Also, the lower divided holding member 26 has a recess 26a to hold two right-hand core pieces 16b and 18b of the lower core pieces 16 and 18, and the upper divided holding member 28 has a recess 28a to hold the two right-hand core pieces 20b and 22b of the upper core pieces 20 and 22. The holding members 24, 26 and 28 may be preferably polished at the bonding faces 24c, 26b and 28b thereof.

A shielding plate 30a is disposed between the lower left-hand core pieces 16a and 18a and a shielding plate 32 a is disposed between the upper left-hand core pieces 20a and 22a. In a similar manner, a shielding plate 30b is disposed between the lower right-hand core pieces 16b and 18b and a shielding plate 32b is disposed between the upper right-hand core pieces 20b and 22b. The shielding plates 30a, 30b, 32a and 32b serve to prevent cross talk between the tracks $L_1$ and $R_1$ and between the tracks $L_2$ and $R_2$. The shielding plates may be held in each extended portion of the recesses of each holding member.

Referring now to FIG. 5, the lower and upper divided holding members 26 and 28 in which the right-hand core pieces 16b, 18b and 20b, 22b are held, respectively, are bonded to the common holding member 24 in which the first core pieces 16a, 18a, 20a and 22a are held. A spacer 34a is interposed between the common holding member 24 and the lower divided holding member 26 and a spacer 34b is interposed between the common holding member 24 and the upper divided holding member 28. The spacer 34a has a relatively large thickness of about 3 microns which is adapted to provide a recording gap length between the two left-hand core pieces 16a, 18a and the two right-hand core pieces 16b, 18b. This corresponds to the gap g, and $g_2$ in FIG. 2. The spacer 34b has a relatively small thickness of about 0.6 microns which is adapted to provide a reproducing gap length between the two left-hand core pieces 20a, 22a and the two right-hand core pieces 20b, 22b. This corresponds to the gap $g_3$ and $g_4$ in FIG. 2. It should be noted that the magnetic head 10 can be used for each of the heads $H_1$ and $H_2$, as shown in FIG. 2.

In case magnetic head 10 is used as heads $H_1$ and $H_2$ two magnetic heads are provided in a symmetrical manner. Of course, the two magnetic heads should be adjusted in their height so that they are located at proper track position. They may be preferably contained in a shielding case, if necessary. Then, since the two magnetic heads have two recording gaps and two reproducing gaps formed in line, respectively, stereo record and/or playback can be accomplished in a reversible manner and a three head system of excellent characteristic can be easily obtained. It should be noted that since the lower and upper operating gaps for record and playback are formed in line, both of operating gaps can be adjusted in their vertical position in a simultaneous manner.

Although, in the illustrated embodiment, the holding members are ship-shaped, they may be of board of ceramics, for example, on which the core pieces are provided. The magnetic head assembly may have more than two groups of core pieces so that they may be applied for a multi-channel cassette tape recorder.

While one preferred embodiment of the invention has been illustrated and described with reference to the accompanying drawing, it will be understood by those skilled in the art that it is by way of example, and that various changes and modifications may be made without departing from the spirit and scope of the invention, which is intended to be defined only to the appended claims.

What is claimed is:

1. A magnetic head for reversibly recording and reproducing having a plurality of operating gaps substantially in line which are formed between a plurality of pairs of left-hand and right-hand core pieces facing each other with shielding between adjacent pairs, said left-hand and right-hand core pieces including first and second core piece groups, characterized by the combination of: a common holding member to hold one-hand core pieces together; first and second divided holding members to hold first and second core piece groups of other-hand core pieces, respectively; first spacer means interposed between said first core piece group of said other-hand core pieces and the corresponding core piece group of said one-hand core pieces; and second spacer means interposed between said second core piece group of said other-hand core pieces and the corresponding core piece group of said one-hand core pieces; said first and second spacer means establishing recording and reproducing gap groups, respectively, with said recording gap group having a gap width greater than said reproducing gap width and substantially in line therewith.

2. A magnetic head as set forth in claim 1, wherein said shielding includes a shielding plate disposed between one pair of left and right-hand core pieces and an adjacent pair of left and right-hand core pieces.

3. A magnetic head as set forth in claim 1, and usable in a reversible cassette tape recorder in which two of said magnetic heads are provided in a reversed and symmetrical manner for forward and reverse stereo playing.

* * * * *

UNITED STATES PATENT AND TRADEMARK OFFICE
CERTIFICATE OF CORRECTION

PATENT NO. : 4,414,596
DATED : November 8, 1983
INVENTOR(S) : Niro Nakamichi

It is certified that error appears in the above—identified patent and that said Letters Patent is hereby corrected as shown below:

Abstract, on the title page
   Line 2, "had" should be --has--

Column 3, line 6, after "hand" insert --core pieces--

Column 3, line 31, delete "first" and insert --left-hand--

Signed and Sealed this

Eighth Day of May 1984

[SEAL]

Attest:

GERALD J. MOSSINGHOFF

Attesting Officer

Commissioner of Patents and Trademarks